Oct. 13, 1970  YOSHIO FUKUSHIMA  3,533,705
CORRECT EXPOSURE INDICATING APPARATUS FOR CAMERAS
Filed Oct. 19, 1965

INVENTOR
Yoshio Fukushima
BY Burgess, Ryan + Hicks
Attys.

3,533,705
CORRECT EXPOSURE INDICATING APPARATUS
FOR CAMERAS
Yoshio Fukushima, Tokyo, Japan, assignor to Kabushiki
Kaisha Ricoh, Tokyo, Japan, a corporation of Japan
Filed Oct. 19, 1965, Ser. No. 498,031
Claims priority, application Japan, Dec. 10, 1964,
39/69,566; Feb. 8, 1965, 40/6,882
Int. Cl. G01j 1/42, 1/52
U.S. Cl. 356—222                         10 Claims

ABSTRACT OF THE DISCLOSURE

Photoelectric circuits including a photosensitive element or elements, indicating light or lights, and an adjustable resistance all in circuits with a suitable power source such as a battery.

BACKGROUND OF THE INVENTION

This invention relates to apparatus having electric circuits consisting of a series of parallel connections of indicator lamps and photosensitive elements such as selenium cells or cadmium sulphite cells which convert a change in the light intensity into a change of electric current or voltage.

SUMMARY OF THE INVENTION

In particular, it relates to an apparatus by means of which the adjustment of the circuit current, depending on the average intensity of the incident light, causes the indicator lamps to light up in a fixed state to indicate the correct photographic exposure.

Furthermore this invention relates to apparatus wherein the photometric range is extended in accordance with the electric current in the load circuit.

The first object of this invention is to construct an inexpensive exposure-indicating apparatus which is simple and stable in its mechanism.

The second object of this invention is to extend the photometric range of the exposure meter by very simple circuits.

The third object of this invention is to indicate the correct exposure of, for example, film in a camera by comparing the state of the lighting of the indicator lamps.

The fourth object of this invention is to indicate the over or under exposure by the state of the lighting of indicator lamps.

The aforesaid features of this exposure-indicating apparatus will be better understood from the following more detailed description, taken with the accompanying drawings of the electric circuits.

DRAWINGS

In all of the above figures, the same numerals will be used to designate the same elements.

Figure 1:
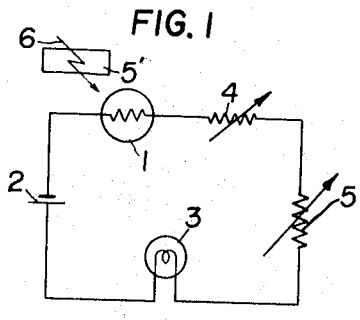
FIG. 1 shows the fundamental circuits of this invention.

In FIG. 1, 1 is a light sensitive photoelectric element, 2 is a direct current power supply such as dry cells or mercury cells, 3 is the said indicator lamp, and 4 is an adjusting resistance, 1, 2, 3 and 4 are always connected in series. 5 is a current adjusting device such as a variable resistance. 5′ is a device such as an adjustable aperture or filter which controls the light intensity which falls upon the element 1. Adjusting either of 5 or 5′ is enough to control the photocurrent.

When the element 1 is a photovoltaic one, the direct current power supply 2 is unnecessary.

When the incident light 6 from the photographic object falls upon the element 1, the electromotive force or the resistance of the element 1 varies according to the average intensity of the incident light. Therefore the electric current in the circuit including the indicator lamp varies and consequently the brightness of the indicator lamp varies according to the average intensity of the incident light.

By adjusting the device 5 or 5′ the change in the resistance of the indicator lamp circuit results in a change in the brightness of the indicator lamp 3.

To indicate the correct exposure or to set the camera automatically at the correct exposure, the adjusting device 5 or 5′ should be connected to the exposure indicating needle or the exposure controlling mechanism of the camera such as a stop of a lens or the shutter speed changing mechanism and then the indicator lamp should be arranged so as to indicate the correct exposure at its certain brightness. The lower brightness of the indicator lamp should indicate the under exposure and the higher brightness of the indicator lamp should indicate the over exposure. The adjusting resistance 4 may be set at a fixed value according to the speed of the photographic films. The above mentioned description applies correspondingly to each circuit of FIG. 2 through FIG. 7.

In this invention it is necessary to vary the incident light adjusting device through a wide range according to the wide variation of the illumination. Now assuming that the ratio between the maximum and the minimum value of the illumination at the photosensitive surface of the element 1 is 1:4000 (this estimation is very usual) and the maximum diameter of the stop aperture is 10 mm. Then the necessary minimum diameter of the stop aperture is 10 mm.$\times \sqrt{4000} = 0.16$ mm. Generally speaking the minimum diameter of the practical stop is about 0.5 mm. and such a small aperture as 0.16 mm. can hardly be constructed to operate precisely. Enlarging the minimum aperture diameter up to 0.5 mm., the maximum aperture has to be very large (0.5 mm.$\times \sqrt{4000} = 31.5$ mm.) and consequently the element 1 has to be very large and impractical.

Using the neutral density filter instead of the stop (diaphragm opening) the necessary maximum density must be more than 3.6 and it is very difficult to expect the precise controlling at this density level.

Controlling the variable resistance 4, its size has to be large and it is inconvenient.

Figure 2:
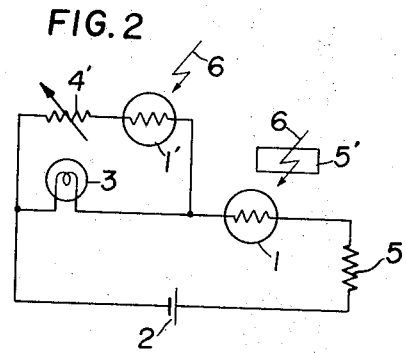
FIG. 2 illustrates the electric circuit of the auxiliary element which is connected in parallel with the indicator lamp circuit in the absence of the incident light controlling device.

In FIG. 2, 1′ is an auxiliary element playing the role of the shunt. It is the same kind of element as 1.

4′ is a variable resistance connected in series with the shunt element 1′. 4′ and 1′ are connected in parallel with an indicator lamp 3 and form a shunt to the load circuit. The shunt element 1′ is not accompanied with the incident light controlling device such as in the case of the element 1.

In FIG. 2 as in FIG. 1 the variation of the intensity of the light 6 causes a variation of the resistance 1 and consequently a variation of the load current, so that it is possible to measure the light intensity by controlling the incident light to obtain the fixed value of the load current. In the circuit of FIG. 2 the variation of the load current caused by the variation of the resistance of the element 1 is smaller than that of the circuit in FIG. 1 and the necessary variation of the stop aperture is not so large as in the case of FIG. 1, because the incident light falling upon the element 1' causes the variation of its resistance value such as in the element 1. Therefore the available photometric range in the circuit of FIG. 2 attainable with available stop apertures, derived from the present state of art, is extended over that of the circuit in FIG. 1. The following discloses a concrete example. As the devices 5 and 5' work to the same end in changing the resistance of the circuit, the variable resistance 5 will be ignored hereinafter to simplify the explanation.

For the apparatus in FIG. 1 and FIG. 2, let:

$S_o$: Stop area at the full aperture,
$E_x$: Illumination at the photosensitive surface of the element when the stop is fully opened,
$R_1$: under the certain illumination, load resistance,
$S_2$: Area of the diaphragm aperture which is wide enough to give illumination $E_a$ upon the photosensitive surface of the element in the circuit shown in FIG. 1.
$S_2$: Area of the diaphragm aperture which is wide enough to give illumination $E_a$ upon the photosensitive surface of the element, of FIG. 1 by controlling the diaphragm when illumination upon the photosensitive surface of the element is $E_x$.
$E_a$: Illumination upon the photosensitive usrface of element 1 of the circuit shown by FIG. 2, which is given by controlling the diaphragm when scene brightness is $B_x$, and just intense enough to produce current $i_o$, Increasing the illumination from the minimum detectable level, the apparatus in FIG. 2 allows for a larger area of stop aperture than the apparatus in FIG. 1 to create the fixed amount of the electric current in the load circuit. Therefore the apparatus of FIG. 2 has a wider range of photometry than that of FIG. 1 attainable with currently available stop apertures, which comes from the present state of the engineering.

The same argument applies to the usage of corresponding density filters or adjusting resistance 4' to control the incident light at the element.

Figure 3:
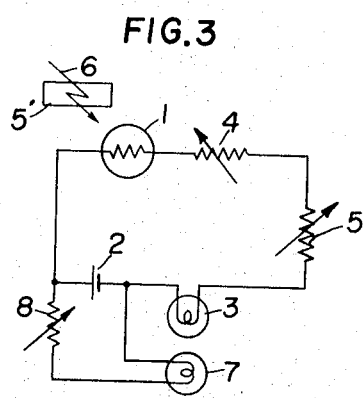
FIG. 3 depicts the circuit in the case of photoconductive element, connecting the auxiliary indicating lamp with the power supply in parallel.

In FIG. 3 the element which corresponds to the element 1 in FIG. 1 is photoconductive. The auxiliary indicator lamp 7 and the variable resistance 8 are connected in parallel with the main indicator lamp circuit. The main indicator lamp and the auxiliary indicator lamp always give an equal brightness at the correct exposure by adjusting the resistance 8.

Figure 4:
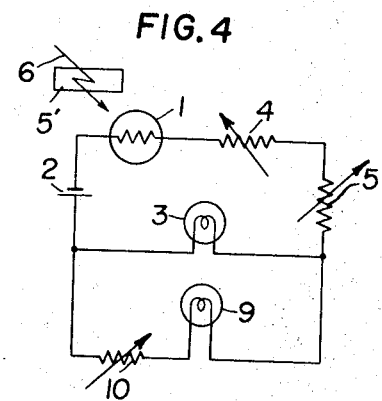
FIG. 4 shows the electric circuit in which the main indicator lamp and the auxiliary indicator lamp are connected in parallel.

The apparatus should be arranged so that the correct exposure may be obtained by adjusting the brightness of the main indicator to give a brightness equal to the brightness of the auxiliary indicator lamp. The lesser brightness of the main indicator lamp in comparison with the brightness of the auxiliary indicator lamp shows under exposure, and higher brightness of the main indicator lamp in comparison with the brightness of the auxiliary indicator lamp shows over exposure. Comparing the brightness of the two indicator lamps in this method the correct exposure can be obtained easily in high precision. FIG. 4 shows the electric circuit in which the auxiliary indicator lamp 9 and the adjusting resistance 10 are connected in parallel with the main indicator lamp 3 already shown in FIG. 1. When the resistance of the circuit including the main indicator lamp is decreased, at first the main indicator lamp lights up and then the auxiliary indicator lamp follows providing the proper value of the resistances 9 and 10 is selected. The order of lighting up may be reversed. Often it is more convenient that the main indicator lamp lights before the auxiliary one. If only the main indicator lamp is lit at the correct exposure, adjustment for the correct exposure is a simple task. When both indicator lamps are not lighting they show under exposure. When the both indicator lamps are lighting they show the over exposure.

Figure 5:
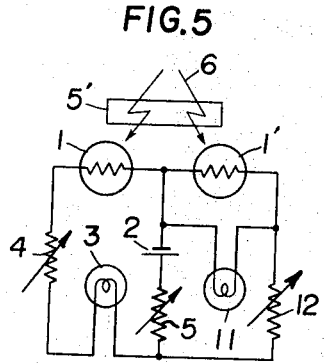
FIG. 5 is an illustration of the electric circuit in which the main indicator lamp is connected in parallel with the auxiliary lamp and the auxiliary photoconductive element in case that the element is photoconductive.
Figure 6:
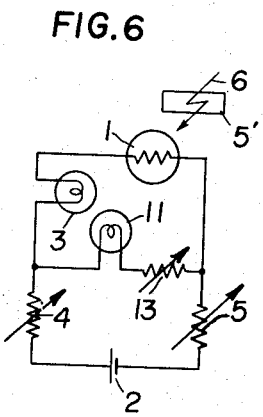
FIG. 6 illustrates the electric circuit in which the auxiliary indicator lamp is connected in parallel with the main indicator lamp and the photoconductive element.

In FIG. 5 and FIG. 6 the element, shown as 1 in FIG. 1 is photoconductive and the auxiliary indicator lamp 11 is connected in parallel with the element 1 and the main indicator lamp 3.

The electric circuit of FIG. 5 includes the auxiliary photoconductive element 1' in addition to the main photoconductive element 1. In FIG. 6 the single photoconductive element 1 plays the both roles of main and auxiliary element. 12 and 13 are adjusting resistances.

In FIG. 5, by selecting the values of the resistances in 1 and 1', decreasing of the resistances in 1 and 1' results in increasing of the voltage across the resistances 4 and 12. Therefore the apparatus can be arranged so that at first the brightness of the main indicator lamp might be lower than that of the auxiliary indicator lamp, nextly equal to, and at least higher than the latter according to the increase of the voltage across 4 and 12. The correct exposure should be obtained at the point of equal brightness of both lamps. The lower brightness of the main indicator lamp than that of the auxiliary one gives the under exposure. The higher brightness of the main indicator lamp than that of the auxiliary lamp gives the over exposure.

In these cases by comparing the brightness of the two indicator lamps the correct exposure can be obtained in high precision.

Figure 7:
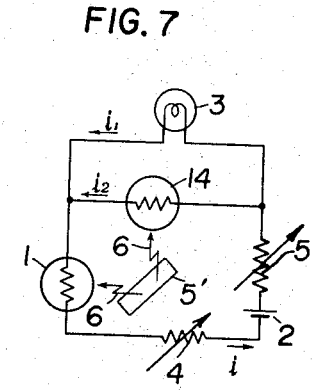
FIG. 7 shows the electric circuit in which the indicator lamp is connected in parallel with the auxiliary photoconductive element which is accompanied with the incident light controlling device.

In the electric circuit of FIG. 7 the element, shown as 1 in FIG. 1, and auxiliary photoconductive element 14 are connected in parallel.

Now let:

$i_1$=Electric current in the main indicator lamp circuit,
$i_2$=Electric current in the circuit of the auxiliary photoconductive element,
$i=i_1+i_2$,
$R_1$=Resistance of the element 1,
$R_{14}$=Resistance of the auxiliary photoconductive element 14,
$r_3$=Resistance of the main indicator lamp 3,
$r_4$=Resistance 4,
$r_5$=Resistance of the adjusting device,
$E$=Electromotive force of the D.C. power supply.

$$i_1+i_2=i$$
$$i_1 r_3 = i_2 R_{14}$$
$$i=\frac{E}{R_1+r_4+r_5+\frac{r_3 R_{14}}{r_3+R_{14}}}$$

therefore $$i_1=\frac{E}{\frac{r_3(r_4+r_5+R_1)}{R_{14}}+r_3+r_4+r_5+R_1}$$

Varying $R_1$ and $R_{14}$ gradually from the larger values to the smaller values, the electric current $i_1$ increases at first from the small value, reaches the maximum value and then begins to decrease. Therefore the apparatus should be arranged so that the correct exposure might be obtained at the point of the maximum brightness in the main indicator lamp caused by the maximum amount of the current $i_1$.

When the adjusting resistance is too large, the main indicator lamp is too bright indicating under exposure. Similarly, when the adjusting resistance is too small, the lamp is too dim indicating over exposure.

It is reasonable to amplify the currents in the circuits in case of necessity.

What is claimed is:
1. An exposure indicating apparatus comprising:
a source of electrical energy,
a photosensitive element having a resistance which varies as a function of the light incident upon it, said element being connected in series with said source of energy, a variable resistance connected in series with said element, an indicator lamp having an illumination which varies as a function of the current passing through it, said lamp being connected in series with said element, manually variable resistive means serially connected with said lamp and associated with means having a setting which varies with the resistance of said resistive means, and a serial combination of a resistance and an auxiliary reference lamp connected to said source and having an illumination which does not vary with the light incident upon said element, so that said resistive means can be adjusted to give correct exposure by comparing the illumination of said indicator lamp with the illumination of said reference lamp, said two lamps being arranged so as to indicate the correct exposure when the illumination of said indicator lamp equals that of said auxiliary lamp.

2. An exposure indicating apparatus comprising:

a source of electrical energy, a photosensitive element having a resistance which varies as a function of the light incident upon it, said element being connected in series with said source of energy, a variable resistance connected in series with said element, an indicator lamp having an illumination which varies as a function of the current passing through it, said lamp being connected in series with said element, means for varying the light incident upon said photosensitive element so that the light incident upon said element is some fraction of the light from a scene, said varying means being connected to an exposure controlling mechanism of the camera, and a serial combination of a resistance, and an auxiliary reference lamp connected to said source and having an illumination which does not vary with the light incident upon said element, so that said varying means can be adjusted to give correct exposure by comparing the illumination of said indicator lamp with the illumination of said reference lamp, said two lamps being arranged so as to indicate the correct exposure when the illumination of said indicator lamp equals that of said auxiliary lamp.

3. An exposure indicating apparatus comprising:

a source of electrical energy, a photosensitive element having a resistance which varies as a function of the light incident upon it, said element being connected in series with said source of energy, a variable resistance connected in series with said element, an indicator lamp having an illumination which varies as a function of the current passing through it, said lamp being connected in series with said element, manually variable resistive means serially connected with said lamp and associated with means having a setting which varies with the resistance of said resistive means, and a serial combination of a resistance and an auxiliary reference lamp, connected in parallel with said indicator lamp, so that said auxiliary lamp will light up only when more electric current flows through said combination than current enough to light up said indicating lamp, and that said resistive means can be adjusted to give correct exposure by comparing the illumination of said indicator lamp with the illumination of said auxiliary lamp, said two lamps being arranged so as to indicate the correct exposure when said auxiliary is out and said indicator lamp only is illuminating.

4. An exposure indicating apparatus comprising:

a source of electrical energy, a photosensitive element having a resistance which varies as a function of the light incident upon it, said element being connected in series with said source of energy, a variable resistance connected in series with said element, an indicator lamp having an illumination which varies as a function of the current passing through it, said lamp being connected in series with said element, means for varying the light incident upon said photosensitive element, so that the light incident upon said element is some fraction of the light from a scene, said varying means being connected to an exposure controlling mechanism of the camera, and a serial combination of a resistance and an auxiliary reference lamp, connected in parallel with said indicator lamp, so that said auxiliary lamp will light up only when more electric current flows through said combination than current enough to light up said indicating lamp, and that said varying means can be adjusted to give correct exposure by comparing the illumination of said indicator lamp with the illumination of said auxiliary lamp, said two lamps being arranged so as to indicate the correct exposure when said auxiliary lamp is out and said indicator lamp only is illuminating.

5. An exposure indicating apparatus comprising:

a source of electrical energy, a photosensitive element having a resistance which varies as a function of the light incident upon it, said element being connected in series with said source of energy, a variable resistance connected in series with said element, an indicator lamp having an illumination which varies as a function of the current passing through it, said lamp being connected in series with said element, manually variable resistive means serially connected with said lamp and associated with means having a setting which varies with the resistance of said resistive means, and a serial combination of an auxiliary lamp and resistance, connected in parallel with a serial net of said element and lamp, so that the illumination of said auxiliary lamp varies in reverse proportion to that of said indicating lamp which varies in proportion to the light incident upon said element, and that said resistive means can be adjusted to give correct exposure by comparing the illumination of said indicator lamp with the illumination of said auxiliary lamp, said two lamps being arranged so as to indicate the correct exposure when the illumination of said indicator lamp equals that of said auxiliary lamp.

6. An exposure indicating apparatus comprising:

a source of electrical energy, a photosensitive element having a resistance which varies as a function of the light incident upon it, said element being connected in series with said source of energy, a variable resistance connected in series with said element, an indicator lamp having an illumination which varies as a function of the current passing through it, said lamp being connected in series with said element, means for varying the light incident upon said photosensitive element so that the light incident upon said element is some fraction of the light from a scene, said varying means being connected to an exposure controlling mechanism of the camera, and a serial combination of an auxiliary lamp and resistance, connected in parallel with a serial net of said element and lamp, so that the illumination of said auxiliary lamp varies in reverse proportion to that of said indicating lamp which varies in proportion to the light incident upon said element, and that said varying means can be adjusted to give correct exposure by comparing the illumination of said indicator lamp with the illumination of said auxiliary lamp, said two lamps being arranged so as to indicate the correct exposure when the illumination of said indicator lamp equals that of said auxiliary lamp.

7. An exposure indicating apparatus comprising:
a source of electrical energy,
a photosensitive element having a resistance which varies as a function of the light incident upon it, said element being connected in series with said source of energy,
a variable resistance connected in series with said element,
an indicator lamp having an illumination which varies as a function of the current passing through it, said lamp being connected in series with said element,
means for varying the light incident upon said photosensitive element so that the light incident upon said element is some fraction of the light from a scene said varying means being connected to an exposure controlling mechanism of the camera, and
a serial combination of an auxiliary lamp and resistance, connected in parallel with a serial net of said element, variable resistance and lamp, and an auxiliary photosensitive element connected in parallel with said auxiliary lamp, with said varying means controlling the light incident upon both said elements, so that the illumination of said auxiliary lamp varies in reverse proportion to that of said indicating lamp which varies in proportion to the light incident upon said element and that said varying means can be adjusted to give correct exposure by comparing the illumination of said indicator lamp with the illumination of said auxiliary lamp, said two lamps being arranged so as to indicate the correct exposure when the illumination of said indicator lamp equals that of said auxiliary lamp.

8. An exposure indicating apparatus comprising:
a source of electrical energy,
a photosensitive element having a resistance which varies as a function of the light incident upon it, said element being connected in series with said source of energy,
a variable resistance connected in series with said element,
an indicator lamp having an illumination which varies as a function of the current passing through it, said lamp being connected in series with said element,
manually variable resistive means serially connected with said lamp and associated with means having a setting which varies with the resistance of said resistive means, and
a serial combination of an auxiliary lamp and resistance, connected in parallel with a serial net of said element, variable resistance and lamp, and an auxiliary photosensitive element connected in parallel with said auxiliary lamp, with said varying means controlling the light incident upon both said elements, so that the illumination of said auxiliary lamp varies in reverse proportion to that of said indicating lamp which varies in proportion to the light incident upon said element and that said resistive means can be adjusted to give correct exposure by comparing the illumination of said indicator lamp with the illumination of said auxiliary lamp, said two lamps being arranged so as to indicate the correct exposure when the illumination of said indicator lamp equals that of said auxiliary lamp.

9. An exposure indicating apparatus comprising:
a source of electrical energy,
a photosensitive element having a resistance which varies as a function of the light incident upon it, said element being connected in series with said source of energy,
a variable resistance connected in series with said element,
an indicator lamp having an illumination which varies as a function of the current passing through it, said lamp being connected in series with said element,
means for varying the light incident upon said photosensitive element so that the light incident upon said element is some fraction of the light from a scene, said varying means being connected to an exposure controlling mechanism of the camera, and
an auxiliary photosensitive element connected in parallel with said indicating lamp, with said varying means controlling the light incident upon both the elements, so that illumination of said indicating lamp increases until it reaches its maximum and then decreases as said incident light increases, and that varying means can be adjusted to give exposure by observing the illumination of said lamp, said lamp being arranged so as to give correct exposure when the illumination reaches its maximum.

10. An exposure indicating apparatus comprising:
a source of electrical energy,
a photosensitive element having a resistance which varies as a function of the light incident upon it, said element being connected in series with said source of energy,
a variable resistance connected in series with said element,
an indicator lamp having an illumination which varies as a function of the current passing through it, said lamp being connected in series with said element,
manually variable resistive means serially connected with said lamp and associated with means having a setting which varies with the resistance of said resistive means, and
an auxiliary photosensitive element connected in parallel with said indicating lamp, with said varying means controlling the light incident upon both the elements, so that illumination of said indicating lamp increases until it reaches its maximum and then decreases as said incident light increases, and that said resistive means can be adjusted to give correct exposure by observing the illumination of said lamp, said lamp being arranged so as to give correct exposure when the illumination reaches its maximum.

References Cited

UNITED STATES PATENTS

| 2,201,606 | 5/1940 | Bing | 95—10 |
|---|---|---|---|
| 3,019,700 | 2/1962 | Colman | 88—23 |
| 3,028,499 | 4/1962 | Farrall | 250—209 |
| 3,049,046 | 8/1962 | Patnode | 88—23 |
| 3,073,225 | 1/1963 | Wiessner | 95—10 |
| 3,187,652 | 6/1965 | Kinnard | 95—10 |
| 3,232,192 | 2/1966 | Stimson | 95—10 |
| 3,315,078 | 4/1967 | Deelman et al. | 250—205 |
| 3,321,632 | 5/1967 | Wood | 250—209 |
| 3,323,430 | 6/1967 | Cooper | 88—23 |

FOREIGN PATENTS

| 1,174,531 | 7/1964 | Germany. |
|---|---|---|

RONALD L. WIBERT, Primary Examiner

R. J. WEBSTER, Assistant Examiner

U.S. Cl. X.R.

95—10, 64; 250—210, 214; 340—228; 356—229, 230, 231, 233

UNITED STATES PATENT OFFICE
CERTIFICATE OF CORRECTION

Patent No. 3533705                              Dated  October 13, 1970

Inventor(s)   Yoshio Fukushima

It is certified that error appears in the above-identified patent and that said Letters Patent are hereby corrected as shown below:

Column 3, lines 20-37, delete entire lines.

Signed and sealed this 15th day of June 1971.

(SEAL)
Attest:

EDWARD M. FLETCHER, JR.              WILLIAM E. SCHUYLER, JR.
Attesting Officer                    Commissioner of Patents